United States Patent
Hu et al.

(10) Patent No.: US 9,735,702 B2
(45) Date of Patent: Aug. 15, 2017

(54) OPERATING METHOD OF FULL-BRIDGE MODULAR MULTILEVEL CONVERTER BOOSTING AC VOLTAGES FOR HIGH VOLTAGE DIRECT CURRENT TRANSMISSION

(71) Applicant: HUAZHONG UNIVERSITY OF SCIENCE AND TECHNOLOGY, Wuhan, Hubei (CN)

(72) Inventors: Jiabing Hu, Hubei (CN); Maozeng Lu, Hubei (CN); Muchao Xiang, Hubei (CN); Lei Lin, Hubei (CN)

(73) Assignee: Huazhong University of Science and Technology, Wuhan, Hubei (CN)

( * ) Notice: Subject to any disclaimer, the term of this patent is extended or adjusted under 35 U.S.C. 154(b) by 0 days.

(21) Appl. No.: 15/064,246

(22) Filed: Mar. 8, 2016

(65) Prior Publication Data
US 2017/0170660 A1  Jun. 15, 2017

(30) Foreign Application Priority Data
Dec. 11, 2015 (CN) .......................... 2015 1 0923338

(51) Int. Cl.
*H02M 7/483* (2007.01)
*H02J 3/36* (2006.01)

(52) U.S. Cl.
CPC ............... *H02M 7/483* (2013.01); *H02J 3/36* (2013.01); *H02M 2007/4835* (2013.01)

(58) Field of Classification Search
CPC ........................................ H02M 7/483–7/489
See application file for complete search history.

(56) References Cited

U.S. PATENT DOCUMENTS

| 9,627,956 B2 * | 4/2017 | Hu .......................... H02M 1/32 |
| 2015/0194902 A1 * | 7/2015 | Tian ....................... H02M 5/458 363/37 |
| 2015/0295507 A1 * | 10/2015 | Barupati ............... H02M 7/487 363/35 |

OTHER PUBLICATIONS

R. Lizana, M. A. Perez, D. Arancibia, J. R. Espinoza and J. Rodriguez, "Decoupled Current Model and Control of Modular Multilevel Converters," in IEEE Transactions on Industrial Electronics, vol. 62, No. 9, pp. 5382-5392, Sep. 2015.*

(Continued)

*Primary Examiner* — Harry Behm
*Assistant Examiner* — Peter Novak
(74) *Attorney, Agent, or Firm* — Hamre, Schumann, Mueller & Larson, P.C.

(57) ABSTRACT

Provided is an operating method of a full-bridge sub-module (FBSM)-based modular multilevel converter for HVDC transmission with AC-side voltage boosting. The peak value of the AC-side voltage is increased under a constant DC-link voltage by using FBSM's negative output voltage under steady state, wherein keeping the semiconductor's current rating constant during AC-side voltage boosting is in favor of reducing converter cost by decreasing energy interaction between the upper and lower arms in a leg, and further capacitance value of FBSM's capacitor under a constant capacitor voltage ripple, keeping the RMS value of AC-side current constant during AC-side voltage boosting can effectively improve transmission capacity of the converter while reducing converter cost, and keeping converter transmission capacity constant during AC-side voltage boosting can reduce RMS value of arm currents while reducing converter cost, thereby reducing power loss of FBSMs and improving converter efficiency.

8 Claims, 4 Drawing Sheets

(56) References Cited

OTHER PUBLICATIONS

Figure 1:
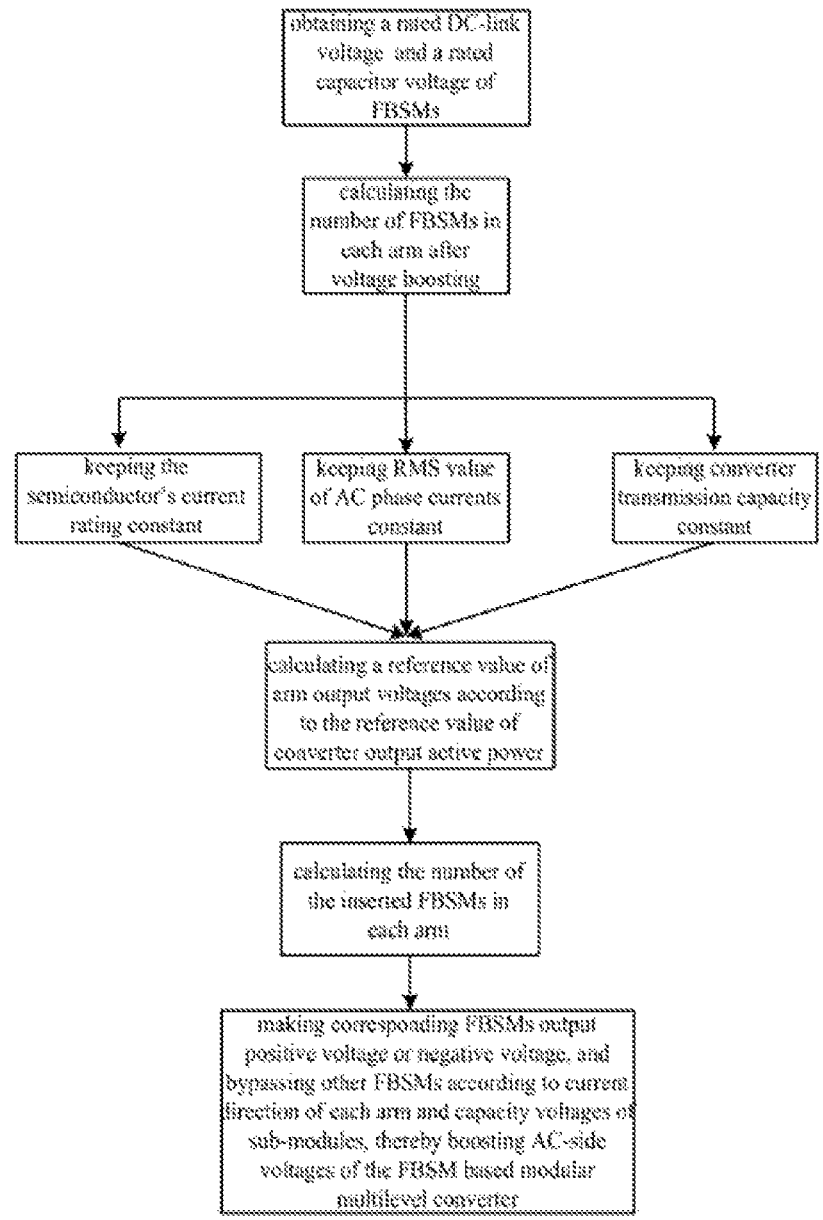

G. P. Adam, "Improved control strategy of full-bridge modular multilevel converter," 2015 IEEE Electrical Power and Energy Conference (EPEC), London, Oct. 2015, pp. 326-331.*

S. Mesic "Investigation of Harmonic Content in Chain-Link Statcom with a Non-Integer Frequency Modulation INdex". Masters Thesis. Chalmers University of Technology, Jun. 2015, pp. 1-75.*

P. Asimakopoulos "Design and Control of Modular Multilevel Converter in an Active Front End Application". Masters Thesis. Chalmes University of Technology, Aug. 2013, pp. 1-100.*

* cited by examiner

OPERATING METHOD OF FULL-BRIDGE MODULAR MULTILEVEL CONVERTER BOOSTING AC VOLTAGES FOR HIGH VOLTAGE DIRECT CURRENT TRANSMISSION

FIELD OF THE INVENTION

The invention relates to a technical field of multilevel power electronic converters, and more particularly to an operating method of a full-bridge sub-module (FBSM)-based modular multilevel converter with AC-side voltage boosting.

BACKGROUND OF THE INVENTION

Modular multilevel converter (MMC) has been a competitive candidate for voltage source converter (VSC) based high voltage direct current (HVDC) transmission due to its advantages of avoiding IGBT series operation, improved scalability, high efficiency and excellent output waveforms with low harmonic distortion.

At present, most of the VSC based HVDC projects adopt the half-bridge sub-module (HBSM) based MMC which cannot isolate a DC short fault and requires breakers on AC side or DC side for fast fault isolation. However, breakers on AC side can only clear the DC fault at the zero crossing point of AC-side current meaning considerable delay time existing before the breaker acts, and the DC short circuit fault can be turned into an AC short circuit fault. In addition, the reclosing timing sequence for an AC breaker is comparatively complex. The technique of DC-side breaker is not mature and highly cost-consuming due to no zero crossing in the DC current. According to CIGRE reports, development of DC-side breakers for the industrial application of ±500 kV and ±800 kV need at least 10 years and 15 years, respectively. A full-bridge sub-module (FBSM) based MMC can output negative voltage, and thus being capable of isolating DC short-circuit faults actively. At present, the FBSM based MMC works in the HBSM based MMC mode during normal operation meaning FBSMs are controlled to only output positive or zero voltage. However, the number of power devices is doubled in each FBSM compared to the HBSM, resulting in increased cost and power losses, thus it is disadvantageous to FBSM based MMC's industrial application.

SUMMARY OF THE INVENTION

In view of the above-mentioned problems, one objective of the invention is to provide an operating method of a FBSM based modular multilevel converter with AC-side voltage boosting under a constant DC-link voltage. FBSMs' negative output voltage is used under the steady state, and the reference value of converter output active power can be calculated according to different control objectives, which can reduce the cost and power loss.

To achieve the above objective, the following is provided an operating method of a FBSM based modular multilevel converter with AC-side voltage boosting, comprising:
(1) obtaining a rated DC-link voltage $U_{dc}$ and a rated capacitor voltage $U_c$ of FBSMs;
(2) calculating the number N of FBSMs in each arm satisfying AC-side voltage boosting requirements without considering the redundancy of FBSMs using a converter modulation index m after AC-side voltage boosting, the rated DC-link voltage $U_{dc}$ and the rated capacitor voltage $U_c$;
(3) calculating a reference value P of converter output active power according to different control objectives, and calculating AC-side output voltages $u_j$ according to the reference value P of converter output active power and a converter output active power p' detected in real time, thereby making the converter output active power p' track the reference value P, where j=a, b and c, representing phase a, phase b and phase c respectively;
(4) calculating a reference value of output voltage of each arm according to the AC-side output voltages $u_j$ and a detected DC-link voltage $u_{dc}$;
(5) calculating the number of the inserted FBSMs in each arm according to the reference value of output voltage of each arm and the rated capacitor voltage $U_c$ of FBSMs;
(6) determining the inserted FBSMs in each arm in the principle of capacitor voltage balancing of FBSMs in each arm according to the detected capacitor voltages of FBSMs of each arm and polarity of the arm currents; and
(7) making FBSMs in each arm required to output positive voltage output positive voltage and those required to output negative voltage output negative voltage, and bypassing other FBSMs, thereby boosting AC-side voltages of the FBSM based modular multilevel converter.

In a class of this embodiment, in step (3), keeping RMS value of AC-side currents constant after AC-side voltage boosting, the reference value P of converter output active power is expressed as $P=mP_0$, where $P_0$ is a converter output active power before AC-side voltage boosting.

In a class of this embodiment, in step (3), keeping semiconductor's current rating constant after AC-side voltage boosting, the reference value P of converter output active power is expressed as $$P = \sqrt{\frac{m_0^2 m^2 \cos^2\varphi + 2m^2}{m_0^2 m^2 \cos^2\varphi + 2m_0^2}} P_0,$$

where $m_0$ is a converter modulation index before AC-side voltage boosting, $\phi$ is a power factor angle, and $P_0$ is a converter output active power before AC-side voltage boosting.

In a class of this embodiment, in step (3), keeping converter transmission capacity constant after AC-side voltage boosting, the reference value P of converter output active power is expressed as $P=P_0$, where $P_0$ is a converter output active power before AC-side voltage boosting.

In a class of this embodiment, in step (2), the number N of FBSMs in each arm satisfying AC-side voltage boosting requirements is expressed as:

$$N = \begin{cases} \dfrac{U_{dc}}{U_c}, & 0 < m \le 1 \\ \dfrac{(1+m)U_{dc}}{2U_c}, & m > 1 \end{cases}.$$

In a class of this embodiment, in step (4), a reference value of output voltage of an upper arm is expressed as $$u_{jp} = \frac{u_{dc}}{2} - u_j,$$

and a reference value of output voltage of a lower arm is expressed as $$u_{jn} = \frac{u_{dc}}{2} + u_j.$$

In a class of this embodiment, in step (5),
the number of the inserted FBSMs in the upper arm is expressed as $$N_{jp} = \left|\text{round}\left(\frac{u_{jp}}{U_c}\right)\right|,$$

while
the number of the inserted FBSMs in the lower arm is expressed as $$N_{jn} = \left|\text{round}\left(\frac{u_{jn}}{U_c}\right)\right|,$$

where $u_{jp}$ and $u_{jn}$ are the reference value of output voltage of the upper arm and lower arm, respectively, and round(x) represents an integer obtained by rounding x.

In a class of this embodiment, in step (5), the number of FBSMs of an arm required to output positive voltages is calculated when the reference value of the arm output voltage is positive, and the number of FBSMs of an arm required to output negative voltages is calculated when the reference value of the arm output voltage is negative.

Advantages of the Present Invention Comprise

Increasing peak values of AC-side voltages under a constant DC-link voltage by using FBSMs' negative output voltage in steady state, wherein keeping the semiconductor's current rating constant after AC-side voltage boosting is in favor of reducing converter cost by decreasing energy interaction between the upper and lower arms in a leg, and further capacitance value of FBSM's capacitor under a constant capacitor voltage ripple, keeping RMS value of AC phase currents constant after AC-side voltage boosting can effectively improve transmission capacity of the converter while reducing converter cost, and keeping converter transmission capacity constant after AC-side voltage boosting can reduce the RMS value of arm currents while reducing converter cost, thereby reducing power loss of FBSMs and improving converter efficiency.

BRIEF DESCRIPTION OF THE ACCOMPANYING DRAWINGS

Figure 2:
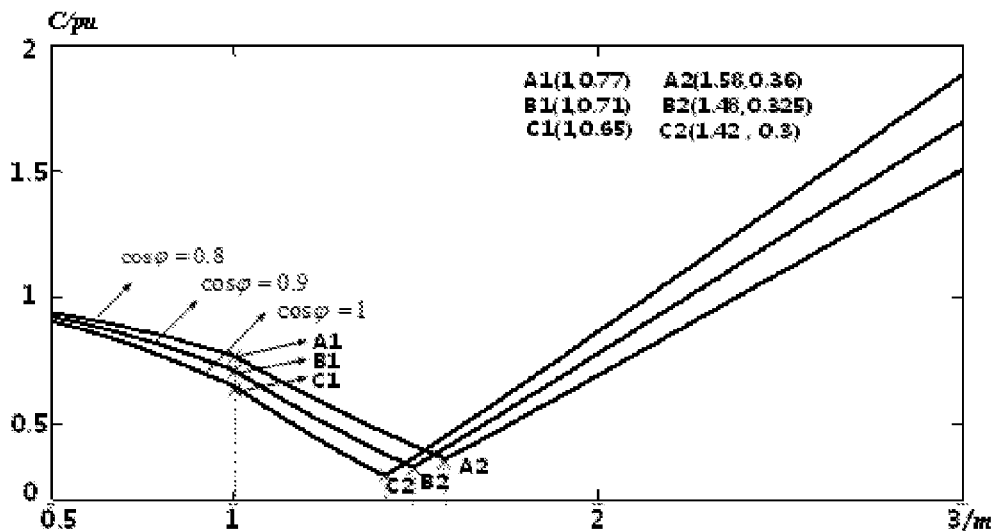
Figure 3:
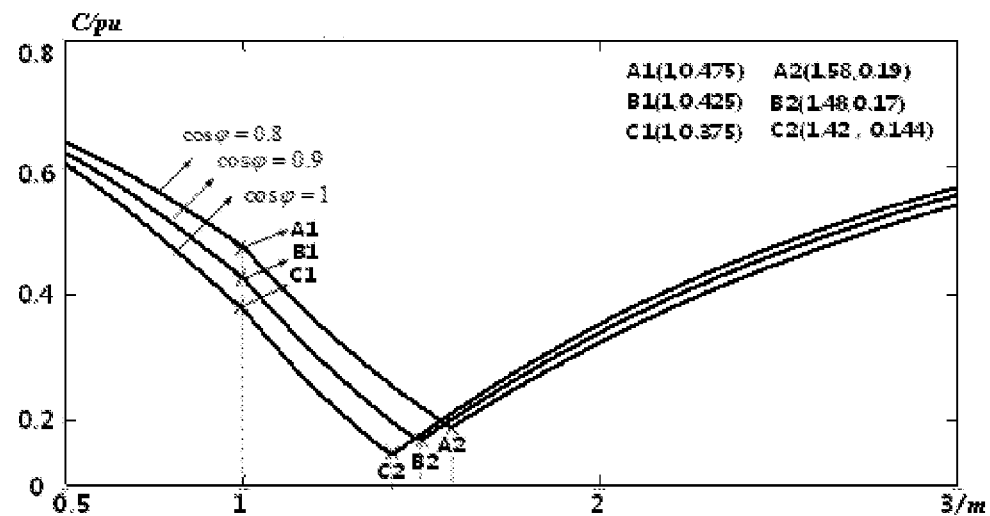
Figure 4:
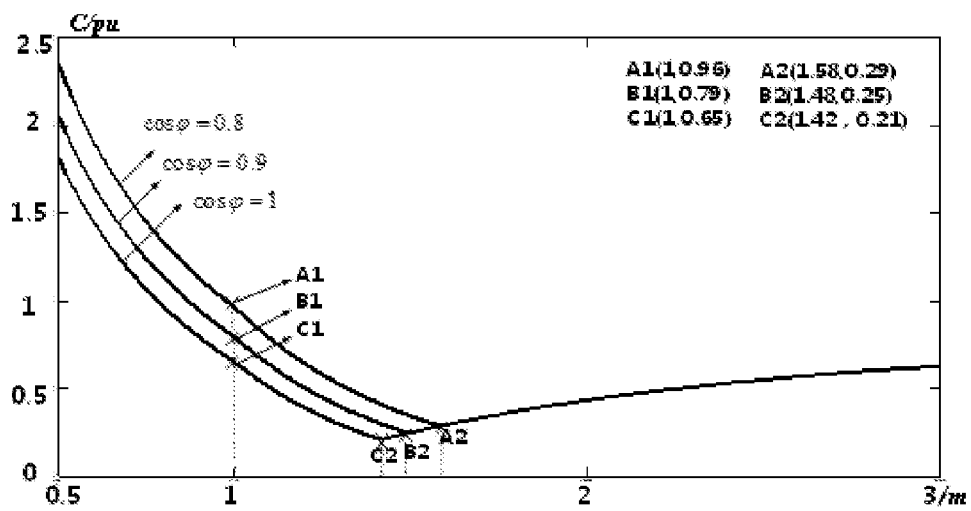
Figure 5:
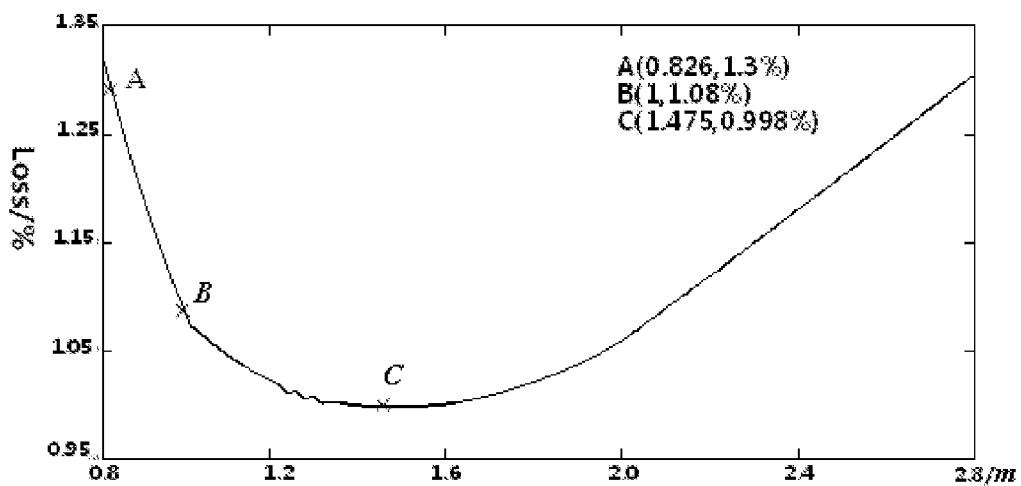
Figure 6:
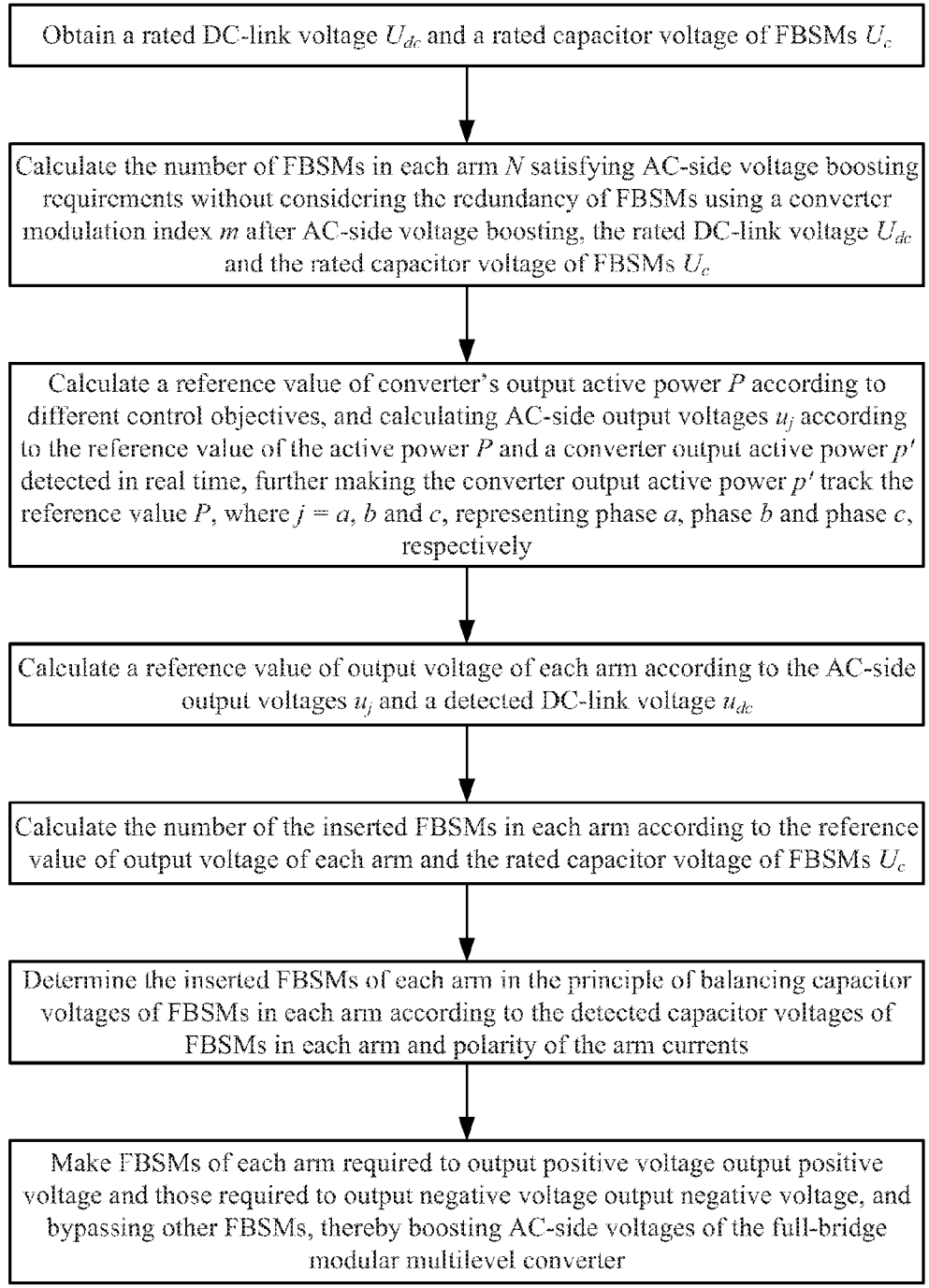

FIG. 1 is a flow chart of an operating method of a FBSM based modular multilevel converter with AC-side voltage boosting of an exemplary embodiment of the invention;
FIG. 2 illustrates the relationships between the required capacitance values of FBSMs and converter modulation index with different power factors under the constant RMS value of AC-side currents and capacitor voltage ripple;
FIG. 3 illustrates the relationships between the required capacitance values of FBSMs and converter modulation index with different power factors under the constant semiconductor's current rating and capacitor voltage ripple;
FIG. 4 illustrates the relationships between the required capacitance values of FBSMs and converter modulation index with different power factors under the constant converter transmission capacity and capacitor voltage ripple; and
FIG. 5 illustrates the relationships between converter power loss and converter modulation index under the unit power factor and constant transmission capacity.
FIG. 6 is a flow chart of an operating method of a FBSM based modular multilevel converter with AC-side voltage boosting of an exemplary embodiment.

SPECIFIC EMBODIMENTS OF THE INVENTION

For clear understanding of the objectives, features and advantages of the invention, detailed description of the invention will be given in the following along with the accompanying drawings and specific embodiments. It should be noted that the embodiments are only used to explain the invention, and not to limit the scope of the invention.

As shown in FIG. 1, an operating method of a FBSM based modular multilevel converter with AC-side voltage boosting of an exemplary embodiment of the invention comprises:
(1) obtaining a rated DC-link voltage $U_{dc}$ and a rated capacitor voltage of FBSMs $U_c$;
(2) calculating the number of FBSMs of each arm N satisfying AC-side voltage boosting requirements without considering the redundancy of FBSMs using a converter modulation index m after AC-side voltage boosting, the rated DC-link voltage $U_{dc}$ and the rated capacitor voltage of FBSMs $U_c$,
where $$N = \begin{cases} \dfrac{U_{dc}}{U_c}, & 0 < m \leq 1 \\ \dfrac{(1+m)U_{dc}}{2U_c}, & m > 1 \end{cases};$$

(3) calculating AC-side output voltages $u_j$ according to different control objectives, where j=a, b and c, representing phase a, phase b and phase c respectively,
which includes the following three conditions:
(A1) keeping RMS value of AC-side currents constant after AC-side voltage boosting, a reference value of converter output active power P is expressed as $P=mP_0$;
(A2) keeping the semiconductor's current rating constant after AC-side voltage boosting, the reference value of converter output active power P is expressed as $$P = \sqrt{\frac{m_0^2 m^2 \cos^2\varphi + 2m^2}{m_0^2 m^2 \cos^2\varphi + 2m_0^2}} P_0;$$

and
(A3) keeping converter transmission capacity constant after AC-side voltage boosting, the reference value of converter output active power P is expressed by $P=P_0$;
where $P_0$ is a converter output active power before AC-side voltage boosting, $m_0$ is a converter modulation index before AC-side voltage boosting, $\omega$ is a power factor angle, AC-side output voltages $u_j$ are calculated according to the reference value of converter output active power P and a converter output active power p' detected in real time, thereby making the converter output active power p' track the reference value P;

(4) calculating a reference value of output voltage of each arm according to the AC-side output voltages $u_j$ and a detected DC-link voltage $u_{dc}$;

Specifically, a reference value of output voltage of an upper arm is expressed as $$u_{jp} = \frac{u_{dc}}{2} - u_j,$$

and a reference value of output voltage of a lower arm is expressed as $$u_{jn} = \frac{u_{dc}}{2} + u_j.$$

(5) calculating the number of the inserted FBSMs in each arm according to the reference value of output voltage of each arm and the rated capacitor voltage of FBSMs $U_c$;

Specifically, the number of the inserted FBSMs in the upper arm is expressed as $$N_{jp} = \left|\text{round}\left(\frac{u_{jp}}{U_c}\right)\right|,$$

and the number of the inserted FBSMs of the lower arm is expressed as $$N_{jn} = \left|\text{round}\left(\frac{u_{jn}}{U_c}\right)\right|,$$

where $u_{jp}$ and $u_{jn}$ are the reference value of output voltage of the upper arm and lower arm, respectively, and round(x) represents an integer obtained by rounding x.

The number of FBSMs of an arm required to output positive voltages is calculated when the reference value of output voltage of the arm is positive, and the number of FBSMs of an arm required to output negative voltages is calculated when the reference value of output voltage of the arm is negative.

(6) determining the inserted FBSMs of each arm in the principle of capacitor voltage balancing of FBSMs in each arm according to the detected capacitor voltages of FBSMs of each arm and polarity of the arm currents; and (7) making FBSMs in each arm required to output positive voltage output positive voltage and FBSMs of each arm required to output negative voltage output negative voltage, and bypassing other FBSMs, thereby boosting AC-side voltages of the FBSM based modular multilevel converter.

For better understanding of the invention for those skilled in the art, the operating method of a FBSM based modular multilevel converter with AC-side voltage boosting of the invention is illustrated in combination with specific embodiments in details as follows.

Embodiment 1

This embodiment is to illustrate advantages in improving transmission capacity of the converter and reducing converter cost while keeping RMS value of AC currents constant after AC-side voltage boosting. Quantitative analysis is give below for better understanding.

Firstly, the advantage of improving transmission capacity of a converter by boosting AC-side voltages is analyzed.

Transmission capacity of the converter S after AC-side voltage boosting can be expressed as $$S = \frac{3}{2} U_{jm} I_{jm},$$

where $U_{jm}$ and $I_{jm}$ are peak values of AC-side voltages and AC-side currents after AC-side voltage boosting respectively. Obviously, the transmission capacity of the converter will increase along with the increase of $U_{jm}$ under a constant $I_{jm}$.

Next, advantage of reducing converter cost by boosting AC-side voltages is analyzed. Assuming the converter operates as a rectifier, take phase a for example, the instantaneous power flowing in the upper and lower arm can be expressed as:

$$\begin{cases} p_{pa} = U_{dc}I_m[-m^2\cos\omega_1 t\cos\varphi + 2\cos(\omega_1 t - \varphi)]/8 - \\ \qquad U_{dc}I_m m\cos(2\omega_1 t - \varphi)/8 \\ p_{na} = U_{dc}I_m[m^2\cos\omega_1 t\cos\varphi - 2\cos(\omega_1 t - \varphi)]/8 - \\ \qquad U_{dc}I_m m\cos(2\omega_1 t - \varphi)/8 \end{cases},$$

where $p_{pa}$ and $p_{na}$ are the instantaneous power flowing in the upper and lower arm respectively, $U_{dc}$ is the rated DC-link voltage, $I_m$, is peak value of AC-side phase current, m is converter modulation index, $\omega_1$ is the fundamental angular frequency, and ω is power factor angle.

Take the upper arm in phase a for example, the arm stored energy can be obtained by integrating the instantaneous power and can be expressed as:

$$E(\omega_1 t) = \int_0^t p_{pa} dt = -\frac{U_{dc}I_m}{8\omega_1}m^2\sin\omega_1 t\cos\varphi + \frac{U_{dc}I_m}{4\omega_1}\sin(\omega_1 t - \varphi) + \frac{U_{dc}I_m}{4\omega_1}\sin\varphi - \frac{U_{dc}I_m}{16\omega_1}m[\sin(2\omega_1 t - \varphi) + \sin\varphi],$$

The maximal energy that capacitors in the upper arm absorb with different converter modulation indices m and power factors cos ω can be expressed as:

$$E_m \begin{cases} \frac{U_{dc}I_m}{2\omega_1}\left[1 - \left(\frac{m\cos\varphi}{2}\right)^2\right]^{1.5}, & m \leq 1 \\ \frac{U_{dc}I_m}{2\omega_1}\max\begin{cases}\left[1 - \left(\frac{m\cos\varphi}{2}\right)^2\right]^{1.5}, \\ \frac{m^2\cos\varphi}{2}\left(1 - \frac{1}{m^2}\right)^{1.5}\end{cases}, & m > 1, m\cos\varphi/2 < 1 \\ \frac{U_{dc}I_m\cos\varphi}{4\omega_1}m^2\left(1 - \frac{1}{m^2}\right)^{1.5}, & m\cos\varphi/2 \geq 1 \end{cases}$$

According to the above analysis, the number of FBSMs in each arm N satisfying AC-side voltage boosting requirements can be expressed as:

$$N = \begin{cases} U_{dc}/U_c, & 0 < m \leq 1 \\ (1+m)U_{dc}/2U_c, & m > 1 \end{cases},$$

where $U_c$ is the rated capacitor voltage of FBSMs.

Assuming capacitor voltages of FBSMs are balanced, thus, the maximal energy shared by each capacitor can be expressed as:

$$E_{sm} = E_m/N.$$

Then, FBSMs' capacitance can be expressed as:

$$E_{sm} = 2\epsilon C U_c^2.$$

where $\epsilon$ is the capacitor voltage ripple ratio.

Finally, the required capacitance value of FBSMs C under the constant RMS value of AC-side current which is a function of the modulation index m can be derived as:

$$C = \begin{cases} \frac{I_m}{4\varepsilon U_c \omega_1}\left[1 - \left(\frac{m\cos\varphi}{2}\right)^2\right]^{1.5}, & m \leq 1 \\ \frac{I_m}{2\varepsilon U_c \omega_1 (1+m)}, & m > 1, \\ \max\left\{\left[1 - \left(\frac{m\cos\varphi}{2}\right)^2\right]^{1.5}, \frac{m^2\cos\varphi}{2}\left(1 - \frac{1}{m^2}\right)^{1.5}\right\}, & m\cos\varphi/2 < 1 \\ \frac{I_m \cos\varphi}{4\varepsilon U_c \omega_1 (1+m)} m^2\left(1 - \frac{1}{m^2}\right)^{1.5}, & m\cos\varphi/2 \geq 1 \end{cases}.$$

FIG. 2 illustrates the relationships between the required capacitance value of FBSMs C and converter modulation index m with different power factors. Clearly, C decreases gradually along with the increase of m in a certain range and reaches the minimum value at a certain point. Table 1 shows the minimum percentage of the capacitance value compared with the value at m=1 under different power factors.

TABLE 1

| Power factor | Optimum modulation index | Reduction ratio |
|---|---|---|
| cosφ = 0.8 | m = 1.58 | 46.8% |
| cosφ = 0.9 | m = 1.48 | 45.1% |
| cosφ = 1.0 | m = 1.42 | 46.2% |

Embodiment 2

This embodiment is to illustrate advantages in reducing converter cost while keeping the semiconductor's current rating constant after AC-side voltage boosting. For better understanding, quantitative analysis is given in the following.

Assuming harmonic circulating currents are suppressed effectively, the RMS value of the arm current $I_r$ can be expressed as:

$$I_r = \sqrt{(I_{dc}/3)^2 + (I_m/2\sqrt{5})^2}$$

where $I_{dc}$ is the rated DC current and $I_m$ is peak value of AC-side currents.

Ignoring power loss of the converter, the relationship between $I_{dc}$ and $I_m$ can be expressed as:

$$I_{dc} = \frac{3}{4} m I_m \cos\varphi,$$

where m is converter modulation index and ω is power factor angle.

Furthermore, the relationship between $I_m$ and $I_r$ can be derived as:

$$I_m = \frac{4I_r}{\sqrt{m^2\cos^2\varphi + 2}}.$$

Similar to the analysis in embodiment 1, the relationship between the required capacitance value of FBSMs C and converter modulation index m under the constant semiconductor's current rating can be derived as:

$$C = \begin{cases} \frac{I_r}{\varepsilon U_c \omega_1 \sqrt{m^2\cos^2\varphi+2}}\left[1 - \left(\frac{m\cos\varphi}{2}\right)^2\right]^{1.5}, & m \leq 1 \\ \frac{2I_r}{\varepsilon U_c \omega_1 (1+m)\sqrt{m^2\cos^2\varphi+2}} & m > 1, \\ \max\left\{\left[1-\left(\frac{m\cos\varphi}{2}\right)^2\right]^{1.5}, \frac{m^2\cos\varphi}{2}\left(1-\frac{1}{m^2}\right)^{1.5}\right\}, & m\cos\varphi/2 < 1 \\ \frac{I_r \cos\varphi}{\varepsilon U_c \omega_1 (1+m)\sqrt{m^2\cos^2\varphi+2}} m^2\left(1 - \frac{1}{m^2}\right)^{1.5}, & m\cos\varphi/2 \geq 1 \end{cases}$$

FIG. 3 illustrates the relationships between the required capacitance value of FBSMs C and converter modulation index m under different power factors. Clearly, C decreases gradually along with the increase of m in a certain range and reaches minimum at a certain point. Table 2 shows the minimum percentage of the capacitance value compared with the value at m=1 under different power factors.

TABLE 2

| Power factor | Optimum modulation index | Reduction ratio |
|---|---|---|
| cosφ = 0.8 | m = 1.58 | 40% |
| cosφ = 0.9 | m = 1.48 | 40% |
| cosφ = 1.0 | m = 1.42 | 38.4% |

Embodiment 3

This embodiment is to illustrate advantages in reducing converter cost further and improving operating efficiency of the converter while keeping transmission capacity of the converter constant after AC-side voltage boosting. For better understanding, quantitative analysis is given in the following.

Firstly, advantage of reducing converter cost is analyzed.

Similar to the analysis in embodiment 1 and embodiment 2, the relationship between the required capacitance value of FBSMs C and converter modulation index m under the constant transmission capacity can be derived as:

$$C = \begin{cases} \frac{I_{dc}}{3\varepsilon U_c \omega_1 m\cos\varphi}\left[1 - \left(\frac{m\cos\varphi}{2}\right)^2\right]^{1.5}, & m \leq 1 \\ \frac{2I_{dc}}{3\varepsilon U_c \omega_1 m(1+m)\cos\varphi} & m > 1, \\ \max\left\{\left[1-\left(\frac{m\cos\varphi}{2}\right)^2\right]^{1.5}, \frac{m^2\cos\varphi}{2}\left(1-\frac{1}{m^2}\right)^{1.5}\right\}, & m\cos\varphi/2 < 1 \\ \frac{I_{dc}}{3\varepsilon U_c \omega_1 (1+m)} m\left(1 - \frac{1}{m^2}\right)^{1.5}, & m\cos\varphi/2 \geq 1 \end{cases}.$$

FIG. 4 illustrates the relationships between the required capacitance value of FBSMs C and converter modulation index m with different power factors under the constant capacitor voltage ripple. Clearly, C decreases gradually along with the increase of m in a certain range and reaches minimum at a certain point. Table 3 shows the minimum percentage of the capacitance value compared with the value at m=1 under different power factors.

TABLE 3

| Power factor | Optimum modulation index | Reduction ratio |
| --- | --- | --- |
| $\cos\phi = 0.8$ | m = 1.58 | 30% |
| $\cos\phi = 0.9$ | m = 1.48 | 32% |
| $\cos\phi = 1.0$ | m = 1.42 | 32% |

Then, advantage of improving converter operating efficiency by boosting AC-side voltage is analyzed below.

Power loss before and after AC-side voltage boosting is analyzed by the case study where transmission capacity of the converter S is 200 MVA, the number of FBSMs of each arm N is 200, the rated capacitor voltage of FBSMs $U_c$ is 100V, the rated DC-link voltage $U_{dc}$ is ±160 kV, the rated line-to-line voltage at AC side is 162 kV, ω represents power factor angle, and converter modulation index before AC-side voltage boosting $m_0$ is 0.826.

After AC-side voltage boosting, assuming converter modulation index m is larger than 1, the number of FBSMs in each arm after AC-side voltage boosting can be expressed by:

$$N = \frac{(1+m)U_{dc}}{2U_c} = 200 \times \frac{1+m}{2}.$$

$$N = \frac{(1+m)U_{dc}}{2U_c} = 100(1+m)$$

Assuming S maintains 200 MVA after AC-side voltage boosting, reference converter power keeps constant and is expressed by P=S cos ω, and peak value of AC phase currents $I_m$ after AC-side voltage boosting can be expressed as:

$$I_m = \frac{4}{3} \times \frac{P}{mU_{dc}\cos\varphi}.$$

It can be seen that $I_m$ decreases along with the increase of m.

Assuming the harmonic circulating currents are suppressed effectively, RMS value of the arm current $I_r$ can be expressed as:

$$I_r = \sqrt{(I_{dc}/3)^2 + (I_m/2\sqrt{2})^2}.$$

RMS value of the arm current decreases along with the decrease of the AC-side current while $I_{dc}$ keeps constant. Thus, power loss in a single FBSM reduces after AC-side voltage boosting, which is in favor of improving the overall efficiency of the converter when m varies among a certain range.

The total power loss of the above system is calculated by MATLAB under unit power factor using an IGBT type of CM800HC_66H (Mitsubishi), where CPS-PWM is adopted, and the carrier frequency is 250 Hz. FIG. 5 shows the calculated relationship between converter power loss rate, i.e., Loss and m. Clearly, Loss decreases at first and increases thereafter along with the increase of the converter modulation index illustrating the operating method of the invention can reduce power loss of the converter in a certain range of m. Furthermore, Loss reaches a minimum value of about 0.998% when m is 1.475, and reduces by 23.2% compared with the value when m is 0.826, which is 1.3% and reduces by 7.6% compared with the value when m is 1, which is 1.08%. Although preferred embodiments of the invention have been described above, the invention is not limited to disclosure in the embodiments and the accompanying drawings. Any changes or modifications without departing from the spirit of the invention fall within the scope of the invention.

FIG. 6 is a flow chart of an operating method of a FBSM based modular multilevel converter with AC-side voltage boosting of an exemplary embodiment.

What is claimed is:

1. An operating method of a full-bridge sub-module (FBSM)-based modular multilevel converter with AC-side voltage boosting, comprising:
   (1) obtaining a rated DC-link voltage $U_{dc}$ and a rated capacitor voltage of FBSMs $U_c$;
   (2) calculating the number of FBSMs in each arm N satisfying AC-side voltage boosting requirements without considering the redundancy of FBSMs using a converter modulation index m after AC-side voltage boosting, the rated DC-link voltage $U_{dc}$ and the rated capacitor voltage of FBSMs $U_c$;
   (3) calculating a reference value of converter's output active power P according to different control objectives, and calculating AC-side output voltages $u_j$ according to the reference value of the active power P and a converter output active power p' detected in real time, further making the converter output active power p' track the reference value P , where j=a, b and c, representing phase a , phase b and phase c, respectively;
   (4) calculating a reference value of output voltage of each arm according to the AC-side output voltages $u_j$ and a detected DC-link voltage $u_{dc}$;
   (5) calculating the number of the inserted FBSMs in each arm according to the reference value of output voltage of each arm and the rated capacitor voltage of FBSMs $U_c$;
   (6) determining the inserted FBSMs of each arm in the principle of balancing capacitor voltages of FBSMs in each arm according to the detected capacitor voltages of FBSMs in each arm and polarity of the arm currents; and
   (7) making FBSMs of each arm required to output positive voltage output positive voltage and those required to output negative voltage output negative voltage, and bypassing other FBSMs, thereby boosting AC-side voltages of the full-bridge modular multilevel converter.

2. The method of claim 1, wherein in step (3), keeping RMS value of AC-side currents constant during AC-side voltage boosting, the reference value of converter output active power P is expressed as $P=mP_o$, where $P_o$ is a rated output active power before AC-side voltage boosting.

3. The method of claim 1, wherein in step (3), keeping semiconductor's current rating constant after AC-side voltage boosting, the reference value P of converter output active power is expressed as $$P = \sqrt{\frac{m_0^2 m^2 \cos^2 \varphi + 2m^2}{m_0^2 m^2 \cos^2 \varphi + 2m_0^2}} P_0,$$

where $m_o$ is a converter modulation index before AC-side voltage boosting, ø is a power factor angle, and $P_o$ is a converter output active power before AC-side voltage boosting.

4. The method of claim 1, wherein in step (3), keeping converter transmission capacity constant after AC-side voltage boosting, the reference value P of converter output active power is expressed as $P=P_o$, where $P_o$ is a converter output active power before AC-side voltage boosting.

5. The method of claim 1, wherein in step (2), the number of FBSMs in each arm N satisfying AC-side voltage boosting requirements is expressed as:

$$N = \begin{cases} \dfrac{U_{dc}}{U_c}, & 0 < m \leq 1 \\ \dfrac{(1+m)U_{dc}}{2U_c}, & m > 1 \end{cases}.$$

6. The method of claim 1, wherein wherein in step (4), the reference value of output voltage of an upper arm is expressed as $$u_{jp} = \frac{u_{dc}}{2} - u_j,$$

and the reference value of output voltage of a lower arm is expressed as $$u_{jn} = \frac{u_{dc}}{2} + u_j.$$

7. The method of claim 1, wherein in step (5), the number of the inserted FBSMs in the upper arm is expressed as $$N_{jp} = \left| \text{round}\left(\frac{u_{jp}}{U_c}\right) \right|,$$

while the number of the inserted FBSMs in the lower arm is expressed as $$N_{jn} = \left| \text{round}\left(\frac{u_{jn}}{U_c}\right) \right|,$$

where $u_{jp}$ and $u_{jn}$ are the reference value of output voltage of the upper arm and lower arm, respectively, and round(x) represents an integer obtained by rounding x.

8. The method of claim 7, wherein in step (5), the number of FBSMs of an arm required to output positive voltages is calculated when the reference value of the arm output voltage is positive, and the number of FBSMs of an arm required to output negative voltages is calculated when the reference value of the arm output voltage is negative.

* * * * *